US007017113B2

(12) United States Patent
Bourbakis et al.

(10) Patent No.: US 7,017,113 B2
(45) Date of Patent: Mar. 21, 2006

(54) METHOD AND APPARATUS FOR REMOVING REDUNDANT INFORMATION FROM DIGITAL DOCUMENTS

(75) Inventors: Nicholas G. Bourbakis, Dayton, OH (US); Stanley E. Borek, New York Mills, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 509 days.

(21) Appl. No.: 10/314,189

(22) Filed: Dec. 5, 2002

(65) Prior Publication Data

US 2003/0145279 A1 Jul. 31, 2003

Related U.S. Application Data

(60) Provisional application No. 60/351,636, filed on Jan. 25, 2002.

(51) Int. Cl.
*G06F 17/00* (2006.01)

(52) U.S. Cl. ...................................... 715/530; 715/534

(58) Field of Classification Search ................ 715/534, 715/500.1, 511, 512, 514, 515, 522, 523, 715/530

See application file for complete search history.

(56) References Cited

U.S. PATENT DOCUMENTS 4,506,342 A * 3/1985 Yamamoto .................. 707/205
5,724,475 A * 3/1998 Kirsten ....................... 386/109
6,275,610 B1 * 8/2001 Hall et al. .................. 382/180

OTHER PUBLICATIONS

Goldstein, Jade, et al, "Creating and Evaluating Multi-Document Sentence Extract Summaries", Proceedings of the Ninth International Conference on Information and Knowledge Management, Nov. 2000, pp. 165-172.*

Fiala, E.R., et al, "Data Compression With Finite Windows", Communications of the ACM, vol. 32, Issue 4, Apr. 1989, pp. 490-505.*

(Continued)

*Primary Examiner*—William Bashore
*Assistant Examiner*—Laurie Anne Ries
(74) *Attorney, Agent, or Firm*—Joseph A. Mancini

(57) ABSTRACT

Method and apparatus for reconstructing new documents from a group of old ones by removing the existing redundant information. Redundant information (images, text paragraphs) from retrieved multimedia documents is removed. Each document consists of two main parts stored in different databases. The first part of a document represents text paragraphs, the second part consists of the images and drawings related with the text paragraphs. An information reduction methodology examines first the text paragraphs of each document related with a specific topic, and removes the redundant information, such as same or similar paragraphs, by keeping pointers useful for a future reconstruction of the original documents. The remaining text paragraphs and the set of points are used to compose the first version of a new document. The invention also examines all the images related with the set of original documents and removes the same or similar images while keeping pointers that could assist a future reconstruction of the original documents. The invention merges text-paragraphs and images and creates the first stage new document.

6 Claims, 6 Drawing Sheets

OTHER PUBLICATIONS

Uchihashi, Shingo, et al, "Video Manga: Generating Semantically Meaningful Video Summaries", Proceedings of the Seventh ACM International Conference on Multimedia (Part 1), Oct. 1999, pp. 383-392.*
Lin, Chin-Yew, et al, "Compression and Summarization: From Single to Multi-Document Summarization: A Prototype System and Its Evaluation", Proceedings of the 40th Annual Meeting on Association for Computational Linguistics ACL '02, Jul. 2001, pp. 457-464.*
Allan, James, et al, "Temporal Summaries of New Topics", Proceedings of the 24th Annual International ACM SIGIR Conference on Research and Development in Information Retrieval, Sep. 2001, pp. 10-18.*
Radev, Dragomir R., et al, "Special Issue on Natural Language Generation: Generating Natural Language Summaries from Multiple On-line Sources", Computational LInguistics, vol. 24, Issue 3, Sep. 1998, pp. 469-500.*
White, Michael, et al "Multidocument Summarization via Information Extraction", Proceedings of the First International Conference on Human Language technology Research HLT '01, Mar. 2000, pp. 1-7.
Tombros, Anastasios, et al, "Advantages of Query Biased Summaries in Information Retrieval", Proceedings of the 21st Annual International ACM SIGIR Conference on Research and Development in Information Retrieval, Aug. 1998, pp. 2-10.

* cited by examiner

IMAGE -A
Image regions and the graph of gravity $$G(A_{(N1)}) = (N_1R_{12}N_2)\ \Phi_{23}\ (N_1R_{13}N_3)\ \Phi_{34}\ (N_1R_{14}N_4) \cdots \Phi_{67}\ (N_1R_{17}N_7)\ \Phi_{78}\ (N_1R_{18}N_8)\ \Phi_{81}$$

IMAGE -B
Image regions and the graph of gravity

Comparison of Images A and B:
7/8 region relationships same
5/7 angles same

$$G(A_{(N1)}) = (N_1R_{12}N_2)\ \Phi_{23}\ (N_1R_{13}N_3)\ \Phi_{34}\ (N_1R_{14}N_4) \cdots \Phi_{67}\ (N_1R_{17}N_7)\ \Phi_{78}\ (N_1R_{18}N_8)\ \Phi_{89}\ (N_1R_{19}N_9)\ \Phi_{91}$$

METHOD AND APPARATUS FOR REMOVING REDUNDANT INFORMATION FROM DIGITAL DOCUMENTS

PRIORITY CLAIM UNDER 35 U.S.C. §119(e)

This patent application claims the priority benefit of the filing date of a provisional application, Ser. No. 60/351,636, filed in the United States Patent and Trademark Office on Jan. 25, 2002.

STATEMENT OF GOVERNMENT INTEREST

The invention described herein may be manufactured and used by or for the Government for governmental purposes without the payment of any royalty thereon.

BACKGROUND OF THE INVENTION

The World Wide Web is a vast information resource and is being used by millions of people daily. A careful examination of web pages reveals that in addition to words that appear in each web page, there are also other related information that could be used to describe users' search needs more precisely. Such information includes (1) well defined (structured) information about each web page such as its URL and title; (2) metadata associated with each web page such as its size and the time it was last modified; (3) images in a web page; and (4) the links that connect different web pages and images.

Document processing also is an important research area, where several techniques have been developed for separating text-paragraphs from images and drawings. However, the reconstruction of a new document using a number of different documents on the same subject is still an open challenging problem that requires a solution.

OBJECTS AND SUMMARY OF THE INVENTION

One object of the present invention is to provide a method and apparatus for removing redundant text from digital documents.

Another object of the present invention is to provide a method and apparatus for removing redundant images from digital documents.

Yet another object of the present invention is to provide a method and apparatus for synthesizing a new document that is free of redundant text and images.

The invention disclosed herein provides a method and apparatus for reconstructing new documents from a group of old ones by removing the existing redundant information. In particular, this invention removes redundant information (images, text paragraphs) from retrieved multimedia documents. Each document consists of two main parts stored in different databases. The first part of a document represents text paragraphs, the second part consists of the images and drawings related with the text paragraphs. The information reduction methodology examines first the text paragraphs of each document related with a specific topic, and removes the redundant information, such as same or similar paragraphs, by keeping pointers useful for a future reconstruction of the original documents. The remaining text paragraphs and the set of points are used to compose the first version of a new document. This invention also examines all the images related with the set of original documents and removes the same or similar images while keeping pointers that could assist a future reconstruction of the original documents. At this point, the invention merges text-paragraphs and images and creates the first stage new document.

According to an embodiment of the present invention, method for removing redundant information from digital documents, comprises the steps of: organizing text into sentences and paragraphs; analyzing the sentences and the paragraphs; comparing the sentences and paragraphs with other documents; and identifying redundancies between the documents.

According to a feature of the present invention, method for removing redundant information from digital documents, comprises the steps of: extracting statistical features selected from the group consisting of: size of a paragraph in characters; character histograms; number of sentences; number of words in each sentence; word histograms; starting word of each sentence; and ending word of a paragraph; determining whether similar said statistical features exist; if similar statistical features exist, then deciding paragraphs are similar, removing redundant paragraph, and proceeding to the step of comparing said sentences and paragraphs with other documents otherwise, postponing removal of paragraph; analyzing corresponding image and data parts of the paragraph; determining whether the paragraphs are placed in a different order; if the paragraphs are placed in a different order, then analyzing the starting word of each sentence, analyzing the length of each sentence; and proceeding to the step of comparing the sentences and paragraphs with other documents otherwise, proceeding to the step of comparing sentences and paragraphs with other documents.

According to another embodiment of the present invention, method for removing redundant information from digital documents, comprises the steps of: analyzing each image in said document; extracting statistical features from each image, wherein the features are selected from the group consisting of: number of image regions; histogram of colors; relative size of regions; texture of regions; and weighted regions graph, determining whether same features exist; if same features exist, then deciding that images are similar; removing redundant image; and terminating the step of analyzing each image; otherwise, postponing removal of image; analyzing corresponding text and data parts of image; determining whether there is an ambiguity; if there is an ambiguity, then performing image understanding process; making a final decision on removal of image; and returning to the step of removing redundant image; otherwise, proceeding to the step of terminating the step of analyzing each image.

According to a common feature of both embodiments of the present invention, method for removing redundant information from digital documents, comprises the document synthesis steps of: a first step of combining text paragraphs; a second step of combining associated images; reassigning numbers in paragraphs and images; comparing with caption of image; determining whether there is a match; if there is a match, then placing the image after the examined paragraph; assigning a number to said image; reassigning those numbers related to the captions; producing a synthetic document; and terminating the document synthesis steps; otherwise, terminating the document synthesis steps.

DETAILED DESCRIPTION OF THE PREFERRED EMBODIMENT

This invention reconstructs new documents from a group of old ones by removing the existing redundant information. In particular, this invention removes redundant information (images, text paragraphs) from retrieved multimedia documents.

Figure 1:
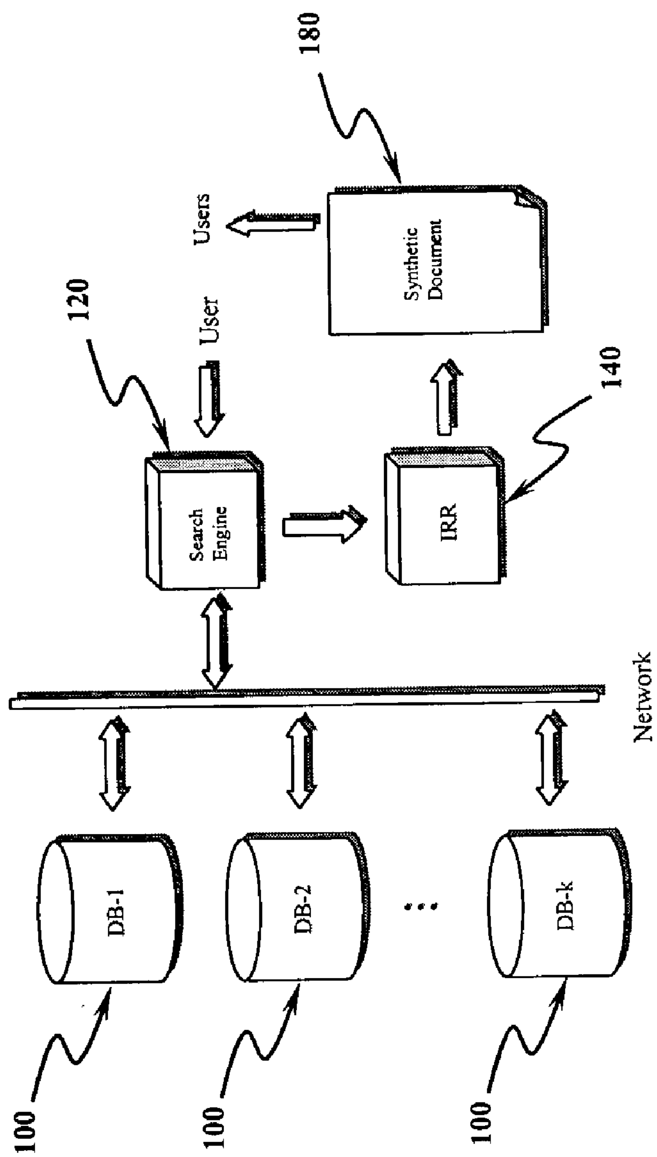
FIG. 1 depicts the extraction of information from various databases via a search engine, removal of information redundancy, and creation of a synthetic document.

Referring to FIG. 1, each document consists of two main parts stored in different databases 100. The first part of a document represents text paragraphs, the second part consists of the images and drawings related with the text paragraphs. The information reduction methodology examines first the text paragraphs of each document related with a specific topic, and removes the redundant information, such as same or similar paragraphs, by keeping pointers useful for a future reconstruction of the original documents. The remaining text paragraphs and the set of points are used to compose the first version of a new document. The methodology also examines all the images related with the set of original documents and removes the same or similar images while keeping pointers that could assist a future reconstruction of the original documents. At this point, the methodology merges text-paragraphs and images and creates the first stage new document.

The original documents are retrieved 110 by the search engine 120 and stored 130 into the user's workstation 140, where the Information Redundancy Removal (IRR) 150 software scheme processes 160 the input pieces of text and image information to create 170 the new document 180.

The information retrieved 110 from different databases will be stored 130 temporarily in the user's workstation 140. This information is composed by text, images and data. Each piece (text, image, data) of this information is stored 130 into a different memory space in order to be efficiently and independently processed. The process used here includes two major parts: removal of the existing redundancies in text and images 190 and first stage document synthesis 200.

Figure 2:
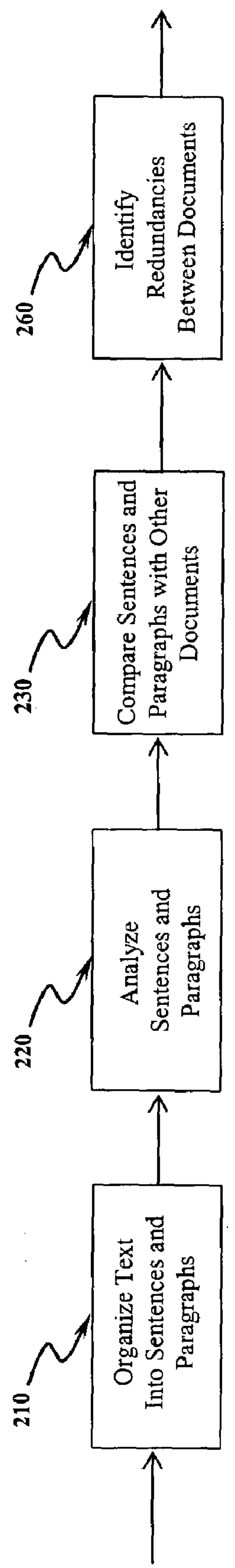
FIG. 2 shows the method for removing redundant text and paragraphs.

Referring to FIG. 2, redundancy in text means the duplication of certain large parts of a text paragraph, or the duplication of an entire paragraph To remove redundant text, all text pieces are organized 210 into paragraphs (P) and sentences (S) without the loss of their referenced pointers to other items such as images, data. Then, each sentence, or paragraph is analyzed 220 and compared 230 with the other sentences and paragraphs from different documents in order that a possible redundancy be discovered.

Figure 3:
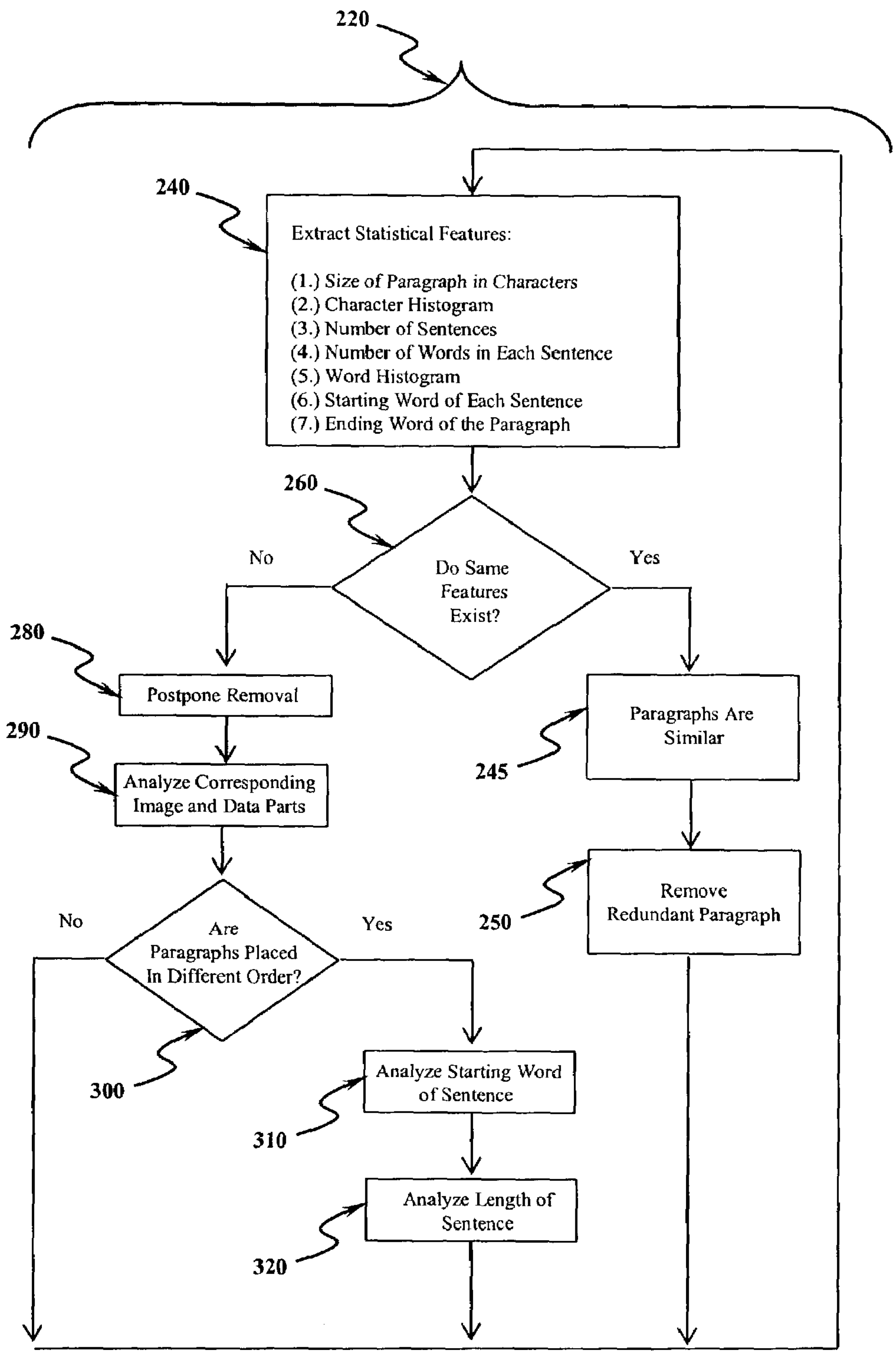
FIG. 3 shows in detail the method for analyzing sentences and paragraphs for redundancy.

Referring to FIG. 3, each text paragraph is analyzed 220 by the IRR method and important statistical features (f) are extracted 240. These statistical features are: (1.) the size of the paragraph (Ps) in text characters; (2.) the character histogram, i.e. the number of A's, B's, C's etc. that appear; (3.) the number of sentences (Sn); (4.) the number of words in a sentence (Sw); (5.) the histogram of words; (6.) the starting word (Ws) of each sentence in a paragraph; and (7.) the ending (or stop) word (We) of the paragraph.

If it is determined that two paragraphs P1 and P2 have the same features 245 described above, then P1 and P2 are considered as similar 247 with a probability p(f) of removal. This means that one of these two paragraphs has to be removed 250 as redundant under the condition that both have the same reference pointers (or ids) to other items, such as images, data, or tables. If is determined that the reference pointers are different 260, then a more detailed analysis takes place on the examined paragraphs and the removal operation is postponed 280 until an analytical examination has taken place 290 at the corresponding images and data parts. In addition, if it is determined that the paragraphs have been placed in a different order 300 in a text-paragraph, a more accurate matching of the two paragraphs will be accomplished by analyzing the starting word of a new sentence (W2) 310 and by analyzing the length of each sentence (SL)) 320.

Figure 4:
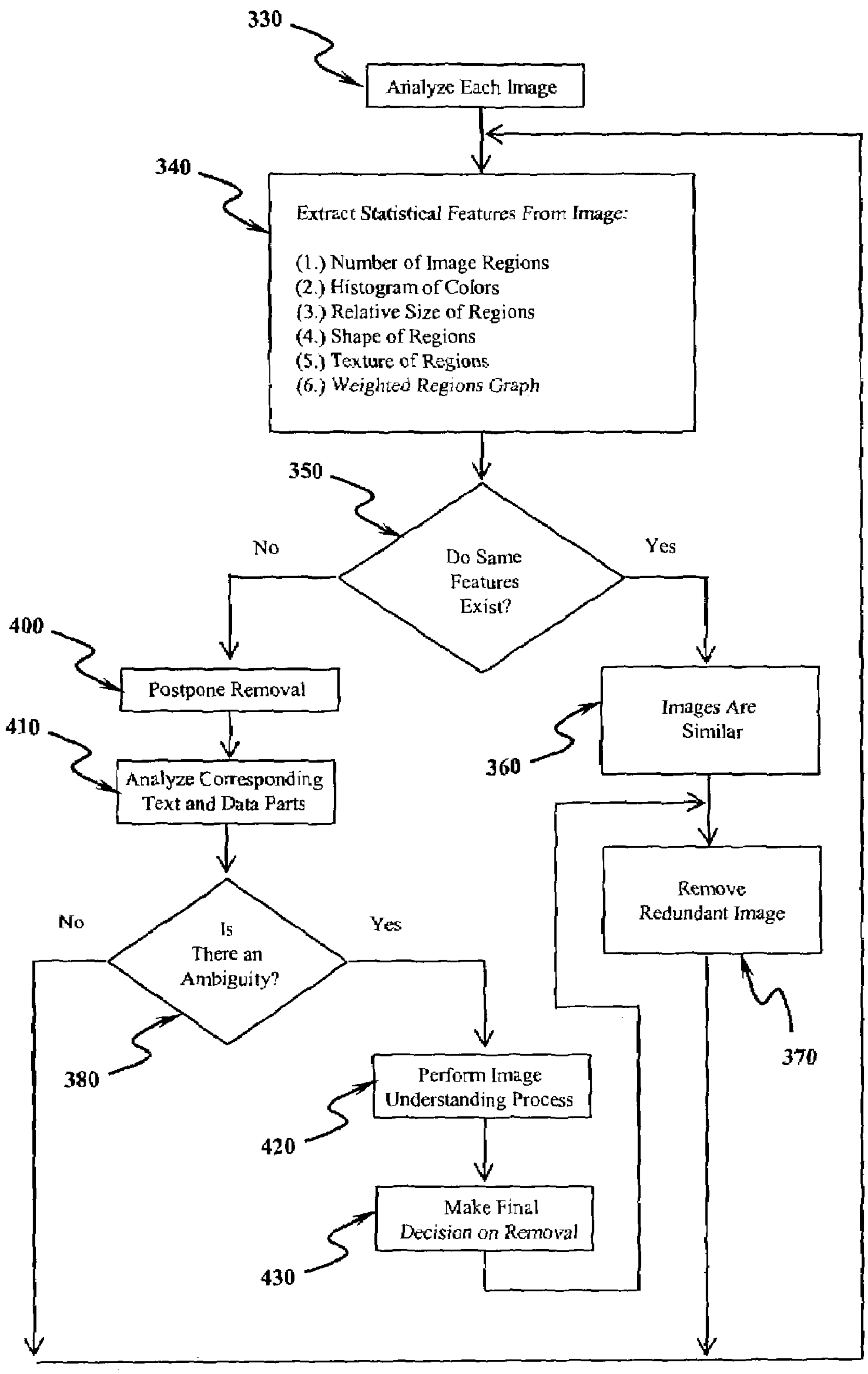
FIG. 4 shows in detail the method for analyzing images for redundancy.

Referring to FIG. 4, image redundancy can also be removed from documents. Image redundancy is the occurrence of the same image more than twice, with the same or different resolution, size and/or color. Each image analyzed 330 and a number of statistical characteristics (c) are extracted 340 from it. These characteristics are: (1.) the number of image regions (nr); (2.) a histogram of colors; (3.) the relative size of the regions (sr); (4.) the shapes of regions (shr); (5.) the texture of regions (tr); and (6.) the weighted regions graph (G)

If it is determined 350 that two images I1 and I2 have the same statistical characteristics described above, then I1 and I2 are determined 360 to be similar or same with a probability p'(f) of removal. In this case, one of these two images will be removed 370 under the condition that both have the same pointers (or ids) to other forms, such as text, and/or data. If it is determined that the pointers are different 350, then a more detailed analysis of the examined images occurs and the removal operation 370 is postponed 400 until an analytical examination occurs 410 on the corresponding text and data parts. If it is determined that there is an ambiguity 380, an image understanding process 420 occurs and is used to make the final decision 430 of removing or not removing one of the examined images.

Figure 5:
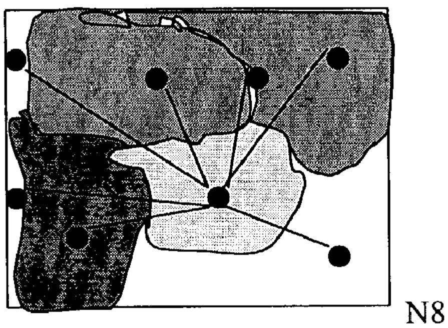
FIG. 5 shows the method for comparing regions of two images and generation of weighted graphs.
Figure 5:
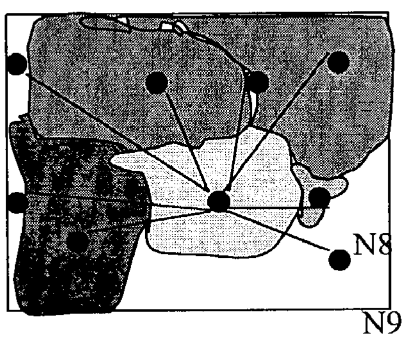

Referring to FIG. 5, the generation of the weighted graph of an image is depicted. Here, the comparison of two images is mainly based on the comparison of their features and especially their regions weighted graphs, which carry all the information needed for each region. Ni represents the vector or record of an image region, Rij represents the relative distance between the regions Ni and Nj, and Φ represents the relative direction or angle between two regions.

Figure 6:
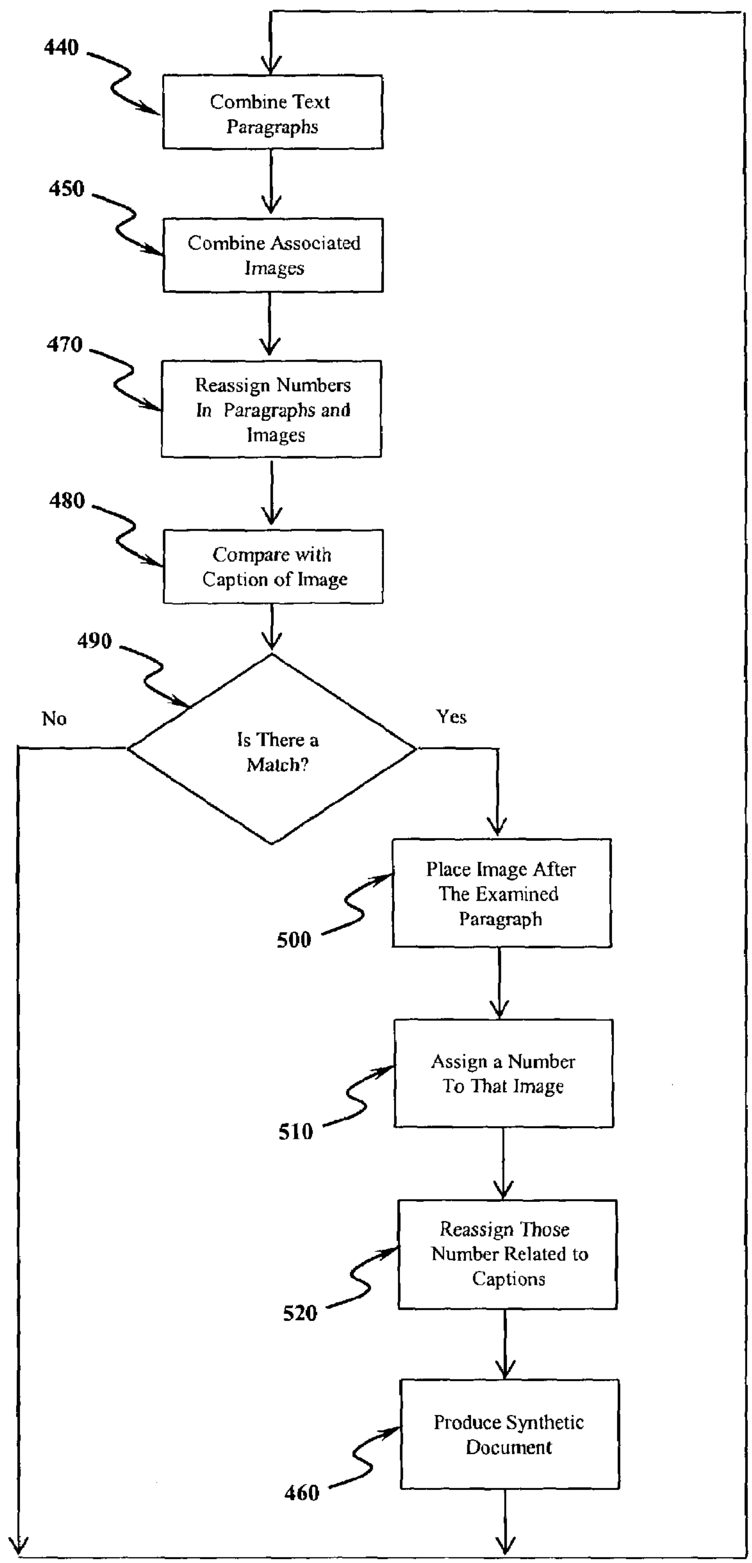
FIG. 6 shows in detail the method for creation of a synthetic document with redundancy removed.

Referring to FIG. 6, the synthesis of text and image information takes place after the removal of redundancies from both text and image parts. The synthesis process combines text paragraphs 440 and combines their associated images 450 to generate a new kind of document 460 by reassigning numbers 470 in paragraphs and images. This information is compared 480 with the "caption" of a particular image. If it is determined that there is a match 490, the image is placed after the examined paragraph 500 and an appropriate number is assigned 510 to it. In addition, all the numbers related with captions are reassigned 520. The synthetic document produced 460 by the information redundancy removal (IRR) contains all the information needed to reconstruct any of the original documents, if necessary.

While the preferred embodiments have been described and illustrated, it should be understood that various substitutions, equivalents, adaptations and modifications of the invention may be made thereto by those skilled in the art without departing from the spirit and scope of the invention. Accordingly, it is to be understood that the present invention has been described by way of illustration and not limitation.

What is claimed is:

1. A software program comprising instructions, stored on computer-readable media, wherein said instructions, when executed by a computer, perform the necessary steps for removing redundant information from digital documents, comprising:

organizing text into sentences and paragraphs;

analyzing said sentences and said paragraphs;

comparing said sentences and paragraphs with other documents; and identifying redundancies between said documents;

wherein said step of analyzing further comprises the steps of:

extracting statistical features selected from the group consisting of:

size of a paragraph in characters;

character histograms;

number of words in each sentence;

word histograms;

starting word of each sentence; and ending word of a paragraph;

determining whether similar said statistical features exist;

IF similar statistical features exist, THEN deciding paragraphs are similar, removing redundant paragraph, and proceeding to said step of comparing said sentences and paragraphs with other documents

OTHERWISE, postponing removal of paragraph;

analyzing corresponding image and data parts of said paragraph;

determining whether said paragraphs are placed in a different order;

IF said paragraphs are placed in a different order, THEN analyzing the starting word of each sentence, analyzing the length of each said sentence; and proceeding to said step of comparing said sentences and paragraphs with other documents

OTHERWISE, proceeding to said step of comparing said sentences and paragraphs with other documents.

2. The software program of claim 1, wherein said instructions perform further steps comprising:

analyzing each image in said document;

extracting statistical features from each said image, wherein said features are selected from the group consisting of:

number of image regions;

relative size of regions;

texture of regions; and weighted regions graph determining whether same features exist;

IF same features exist, THEN deciding that images are similar;

removing redundant image; and terminating said step of analyzing each image;

OTHERWISE, postponing removal of image;

analyzing corresponding text and data parts of image;

determining whether there is an ambiguity;

IF there is an ambiguity, THEN performing image understanding process;

making a final decision on removal of image; and returning to said step of removing redundant image;

OTHERWISE, proceeding to said step of terminating said step of analyzing each image.

3. The software program of claim 1 or claim 2, wherein said instructions perform further document synthesis, comprising:

a first step of combining text paragraphs;

a second step of combining associated images;

reassigning numbers in paragraphs and images;

comparing with caption of image;

determining whether there is a match;

IF there is a match, THEN placing the image after the examined paragraph;

assigning a number to said image;

reassigning those numbers related to said captions;

producing a synthetic document; and terminating said document synthesis steps;

OTHERWISE, terminating said document synthesis steps.

4. A computer apparatus for removing redundant information from digital documents, comprising:

a computer workstation;

a search engine software program residing in said computer workstation;

a plurality of information databases; and an information redundancy removal software program residing in said computer workstation;

wherein said search engine software program comprises instructions, stored on computer-readable media, and wherein said instructions, when executed by said computer workstation, provide means to perform the necessary steps for retrieving digital documents from said plurality of information databases;

wherein said information redundancy removal software program comprises instructions, stored on computer-readable media, and wherein said instructions, when executed by said computer workstation, provide means to perform the necessary steps for removing redundant information from said retrieved digital documents; and wherein said computer-executable instructions within said information redundancy removal software program further provide means for:

organizing text into sentences and paragraphs;

analyzing said sentences and said paragraphs;

comparing said sentences and paragraphs with other documents;

identifying redundancies between said documents extracting statistical features selected from the group consisting of:

size of a paragraph in characters;

character histograms;

number of words in each sentence;

word histograms;

starting word of each sentence; and ending word of a paragraph;

determining whether similar said statistical features exist;

IF similar statistical features exist, THEN deciding paragraphs are similar, removing redundant paragraph, and proceeding to means for comparing said sentences and paragraphs with other documents

OTHERWISE, postponing removal of paragraph;

analyzing corresponding image and data parts of said paragraph;

determining whether said paragraphs are placed in a different order;

IF said paragraphs are placed in a different order, THEN analyzing the starting word of each sentence, analyzing the length of each said sentence; and comparing said sentences and paragraphs with other documents

OTHERWISE, comparing said sentences and paragraphs with other documents.

5. A computer apparatus and a set of information redundancy removal software code, said software code being executable therein so as to remove redundant information from digital documents input thereinto by providing means for:

analyzing each image in each of said documents;

extracting statistical features from each said image, wherein said features are selected from the group consisting of:

number of image regions;

relative size of regions;

texture of regions; and weighted regions graph determining whether same features exist;

IF same features exist, THEN deciding that images are similar;

removing redundant image; and terminating said means for analyzing each image;

OTHERWISE, postponing removal of image;

analyzing corresponding text and data parts of image;

determining whether there is an ambiguity;

IF there is an ambiguity, THEN performing image understanding;

making a final decision on removal of image; and returning to removing redundant image;

OTHERWISE, terminating analyzing each image.

6. The computer apparatus as in claim 4 or claim 5, wherein said information redundancy removal software code/program further comprises computer-executable instructions so as to produce a synthesized document by providing means for:

combining text paragraphs;

combining associated images;

reassigning numbers in paragraphs and images;

comparing with caption of image;

determining whether there is a match;

IF there is a match, THEN placing the image after the examined paragraph;

assigning a number to said image;

reassigning those numbers related to said captions;

producing a synthetic document; and terminating document synthesis;

OTHERWISE, terminating document synthesis.

* * * * *